Figure 1:
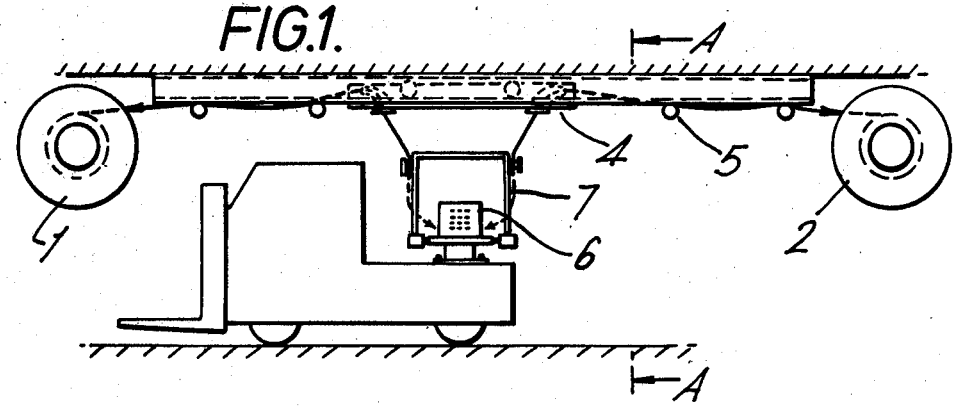

United States Patent [19]

Rasmussen

[11] 3,882,288
[45] May 6, 1975

[54] CABLE SYSTEM FOR THE TRANSMISSION OF ELECTRIC ENERGY FROM A STATIONARY ELECTRIC PLANT TO A TRUCK OR ANOTHER STEERABLE VEHICLE DRIVING FREELY WITHIN THE RANGE OF THE CABLE SYSTEM

[76] Inventor: Rolf Bjorn Rasmussen, Krokliveien 2 b, N-Oslo 5, Norway

[22] Filed: Nov. 28, 1973

[21] Appl. No.: 420,188

[30] Foreign Application Priority Data
Aug. 24, 1973 Norway................................ 3358/73

[52] U.S. Cl.................................. 191/2; 191/12 R
[51] Int. Cl............................................ H02g 11/00
[58] Field of Search.... 191/2, 12 R, 12.2 R, 12.2 A, 191/12.4

[56] References Cited
UNITED STATES PATENTS
| | | | |
|---|---|---|---|
| 1,467,253 | 9/1923 | Sharpsteen........................ | 191/12 R |
| 2,933,024 | 4/1960 | Baggs................................. | 191/12 R |
| 3,705,996 | 12/1972 | Ahmed............................... | 191/12 R |

Primary Examiner—M. Henson Wood, Jr.
Assistant Examiner—D. W. Keen
Attorney, Agent, or Firm—Nolte and Nolte

[57] ABSTRACT

There is disclosed a system comprising a steerable vehicle and means connecting an electrical supply to that vehicle. The vehicle has a slip ring and guide bow arrangement, to which cable elements are connected, the cable elements being guided by a guide carriage movable on a rectilinear path and being trained on reels, from which during movements of the vehicle, the cable elements are reeled and dereeled.

7 Claims, 5 Drawing Figures

CABLE SYSTEM FOR THE TRANSMISSION OF ELECTRIC ENERGY FROM A STATIONARY ELECTRIC PLANT TO A TRUCK OR ANOTHER STEERABLE VEHICLE DRIVING FREELY WITHIN THE RANGE OF THE CABLE SYSTEM

The present invention relates to the transmission of electric energy to electro-hydraulic trucks, the radius of action of which is limited to a certain store room or the like.

In connection with such cable transmissions it is most advantageous if the truck can be driven along any free path within the range of the cable system, e.g. in closed circles in one and the same direction, without resulting in a harmful twist of the flexible transmission cable. Furthermore, it is important that the free span of the flexible cable from the truck is minimal and preferably not exceeding half the length of the short wall of the room, irrespective of where in the room the truck might be. The previously known cable systems were not arranged in such a way that the truck could move freely without the hazard of a harmful cable twist. The truck drivers, thus, had to acquire a special, limited routine of manoeuvre.

It is an object of the present invention to enable the truck drivers to steer the truck freely within the range of the cable system so that it will not be necessary to use a certain routine of manoeuvre so as to avoid any twist of the supply cable.

According to the invention said object is achieved by the fact that the truck is provided with a slip ring contact swivelling in the horizontal plane and having its swivelling part provided with a guide bow swivelling about the vertical center line of the slip ring contact, to which bow two flexible supply cables with a tensile load are secured. Consequently, the truck can drive practically unlimited, preferably in consecutive circles in one and the same direction, without causing any harmful twist of the supply cable.

According to the invention two cable reels are provided, preferably one arranged at the center of each short wall of the room, and having a flexible cable each guided directly down to the truck via stationary pulleys and a common guide carriage which moves on a rectilinear track system mounted on the ceiling between said reels, in or near the longitudinal center line of the room, and a swivelling slip ring contact mounted on the truck and provided with a guide bow, to which the two cables are secured in such a way that the cable tension will maintain the guide bow approximately in parallel with the track system on the ceiling irrespective of which way the truck front faces and irrespective of on which side of the track system the truck is. The remaining features of the invention will appear from the claims.

In consequence of the present solution the equipment to be mounted on the truck is simple and not bulky and will, thus, only to a minimal degree bar the rear view of the driver. Additionally, with this solution the total height between the top area of the truck roof and the lower surface of the ceiling is very small, and the system can, thus, also be used in rooms having a comparatively low ceiling height.

Figure 2:
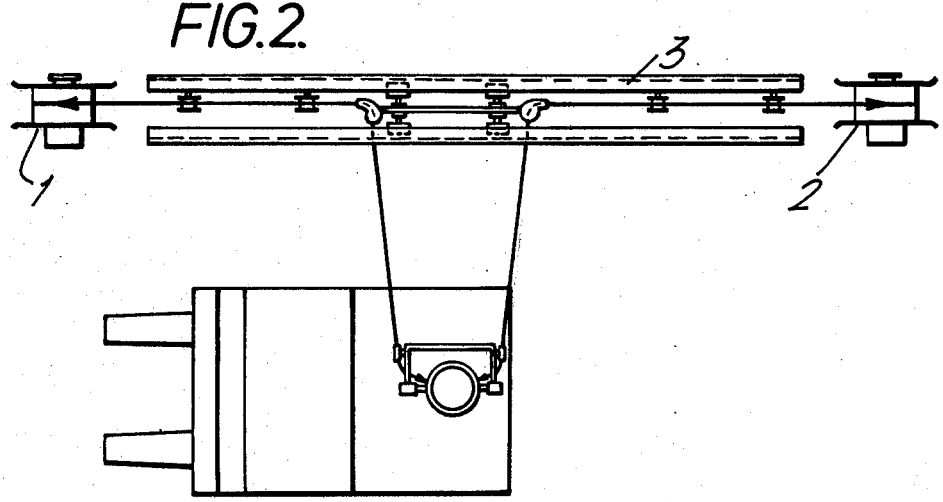
Figure 3:
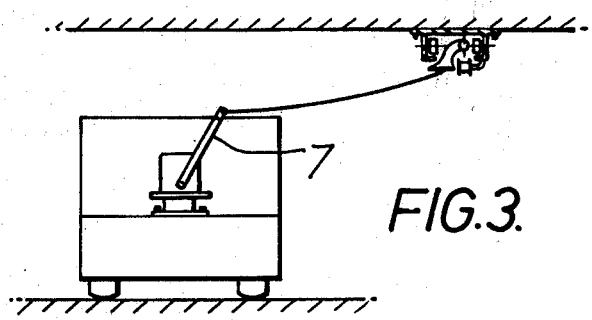
Figure 4:
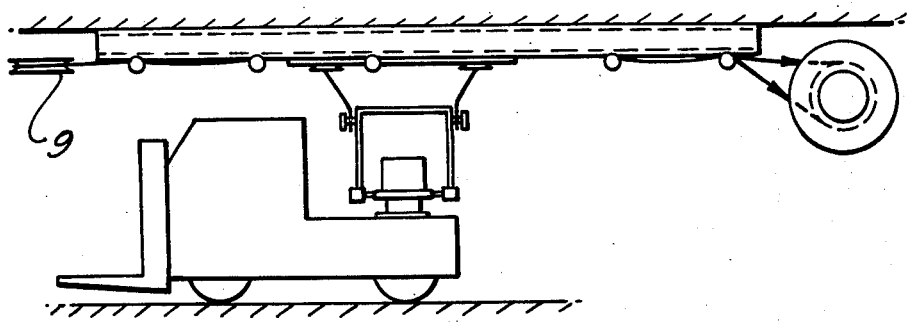
Figure 5:
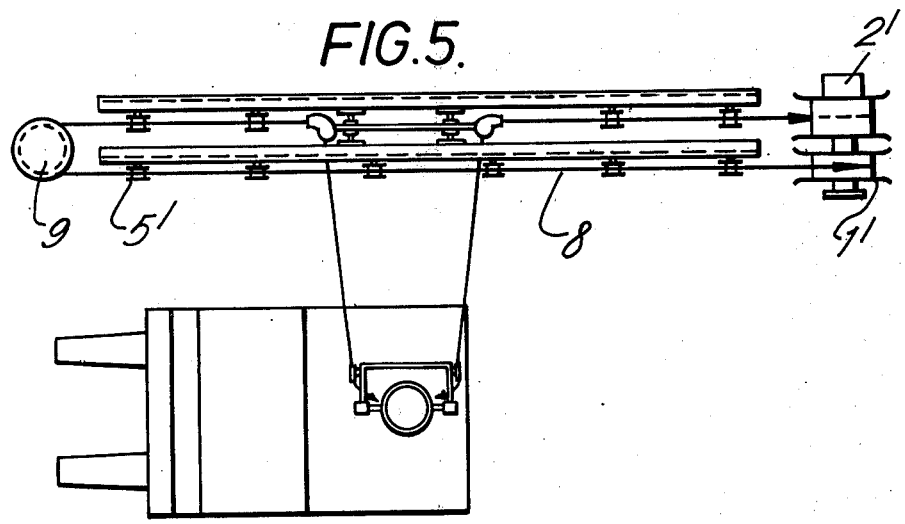

The invention is now described in detail with reference to the accompanying drawing, where FIG. 1 discloses a first embodiment of the invention, FIG. 2 is a top view of the embodiment according to FIG. 1, FIG. 3 shows the embodiment according to FIG. 1, seen from A–A, FIG. 4 shows another embodiment of the invention and FIG. 5 is a top view of the embodiment according to FIG. 4.

In FIGS. 1 and 2 two cooperating cable reels 1 and 2 are shown with the track system mounted in or near the longitudinal center line of the room. The guide carriage 4 is common to the two cables running over stationary pulleys 5. The slip ring contact 6 is mounted on the truck and the guide bow 7 cooperates with said slip ring contact 6. The object of the system according to the invention is to secure that the bow 7 always maintains its approximate parallelism with the carriage 4, irrespective of the truck steering in the room. This is achieved due to the fact that the bow can be rotated over a limited angle to both sides of the vertical position and can, thus, stabilize the rotation of the bow and the slip ring contact in the horizontal plane, even if the tension on the cables should be somewhat different, as e.g. shown in the figure.

The carriage 4 will be pulled along with the cable when the truck moves along the track system, and one cable will then be wound onto its reel, while the other cable is wound off its reel. When the truck moves across the track system, both reels will simultaneously wind the cable on or off as the truck moves towards or away from the track system 3. In FIGS. 4 and 5 a modified embodiment is shown, where the cable reels have been combined into one unit 1' and 2', driven by the common spring battery. Said spring battery only acts mutually between said two reels which, thus, receive momenta of opposite direction when the truck drives along the track system 3. The spring battery does not necessarily require any contact with the stationary central axis. If both reel parts rotate with the same speed in the same direction, the tension of the spring is not changed, but if the reel parts rotate in opposite directions, the spring battery will be tensioned or slackened respectively. One cable 8 runs over the return pulley 9 according to the solution of the invention.

When the truck drives along the track system, both reel parts will rotate in the same direction with the same speed, one reel will wind off cable and the other will wind on, and the spring battery is just brought along without doing any work but keeping the cables tensioned. When the truck, however, drives across the track system, the reel parts will rotate in opposite directions, because both will wind on or off respectively, and the spring battery will be tensioned or slackened respectively.

The cable 8 running over the return pulley 9, may be substituted by a wire, and the reel part 1' can be provided in the shape of a tensioning reel without any electric slip ring unit.

The carriage is provided with two cable guide means, one for each cable, that guide cable into or up from the stationary pulleys 5 respectively. If the two separate cable reels are substituted by one combined reel arranged at one end of the track system, one of the cables, as mentioned above, can be substituted by a control wire.

I claim:

1. In combination: a steerable vehicle, a slip ring contact on said vehicle, said contact having a substantially vertical axis, a guide bow associated with said contact, said guide bow being tiltable about a generally horizontal axis; a rectilinear track disposed above said vehicle; a guide carriage movable along said track, two flexible cable elements guided by said carriage and secured to said guide bow, a least one of said cable elements being a supply cable and contacting said slip ring and means for applying tension to said cables.

2. The combination claimed in claim 1, characterized in that each of the two flexible cable elements runs to the guide carriage and onto a cable reel having permanent winding momentum.

3. The combination claimed in claim 2 characterized in that said cable reels are stationary at ends of the track said track being disposed in a vertical plane including the longitudinal center line of an area within which the vehicle is movable so that the free span of the cable elements does not exceed half of the total breadth of the area and is independent of the length of that area.

4. The combination as claimed in claim 2 characterized in that the reels are arranged in one and the same end of the track and that the cable element running between the guide carriage and one of the reels runs over a return pulley.

5. The combination as claimed in claim 4 characterized in that both reels are provided with a common spring battery constituting said means for applying tension to said cable elements.

6. The combination as claimed in claim 5 characterized in that the spring batteries are arranged in such a manner that each of the reels, in respect to their mutual direction and rotation, receives an essentially constant momentum.

7. The combination as claimed in claim 4, characterized in that the cable element running from the guide carriage over the return pulley and back to one of the reels has been substituted by a wire or the like.

* * * * *